April 18, 1961  J. D. HINES  2,980,088
INTERNAL COMBUSTION ENGINE
Filed Nov. 16, 1959  2 Sheets-Sheet 2
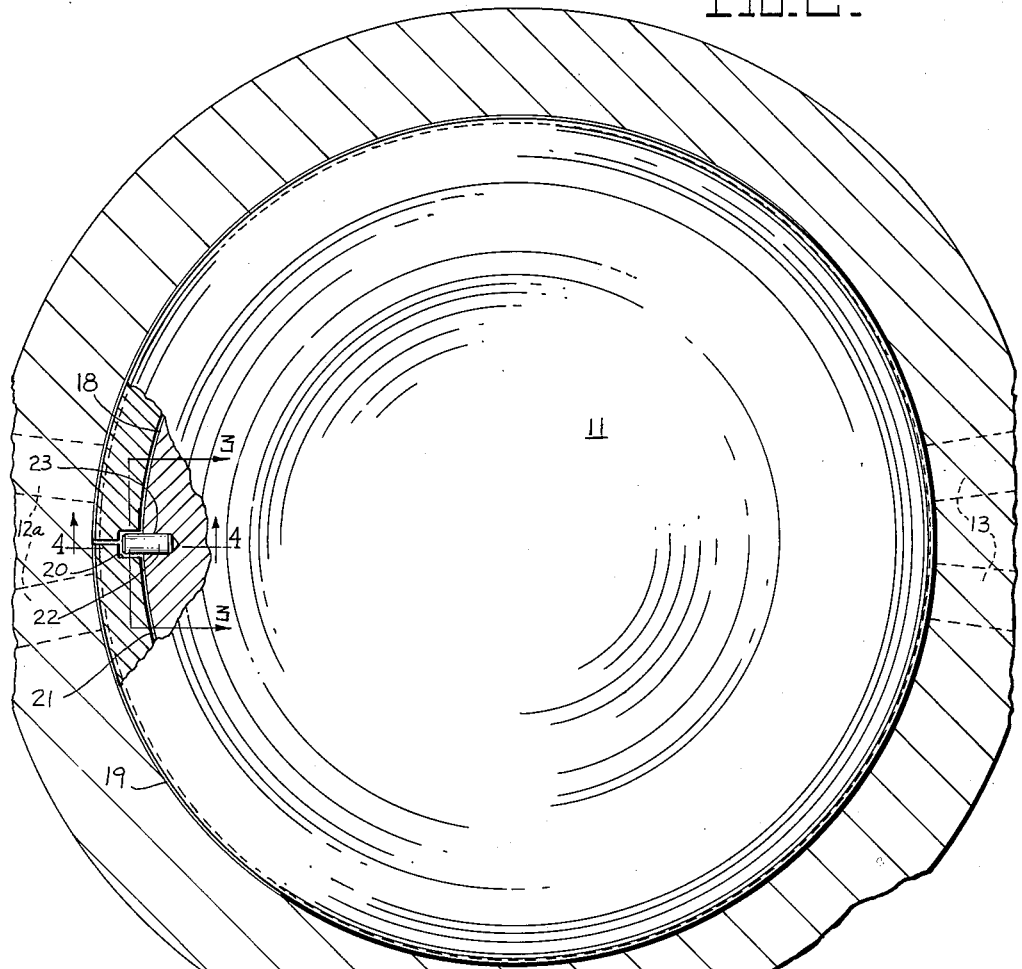
FIG. 2.
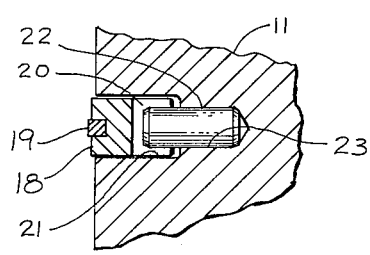
FIG. 4.
FIG. 3.
INVENTOR.
JOHN D. HINES
BY
*Owen & Owen*
ATTORNEYS

United States Patent Office 2,980,088
Patented Apr. 18, 1961

2,980,088

INTERNAL COMBUSTION ENGINE

John D. Hines, Mount Vernon, Ohio, assignor to The Cooper-Bessemer Corporation, Mount Vernon, Ohio, a corporation of Ohio Filed Nov. 16, 1959, Ser. No. 853,207

3 Claims. (Cl. 123—65)

This invention relates to an improvement in internal combustion engines, and is particularly directed to a means for improving the life of piston rings in high output engines in which there is a rapid change in the pressure exerted on the ring from one portion of the cycle to another.

It has been found, in the operation of high pressure two-cycle gas engines that piston ring failures occur principally by reason of the rings working themselves around the pistons to a position such that the ends fall over or near the exhaust ports of the engine so that the ends of the piston rings are subjected to very high temperatures. When this occurs, the oil that usually lubricates the rings with respect to the ring grooves and with respect to the surfaces of the cylinder is burned away so that the ring operates without lubrication and causes wear in the ring groove and wear in the adjacent cylinder wall. Such wear continues until the rings fails which then results in scoring the cylinder and the piston to such an extent that these elements are frequently ruined.

It has been proposed, in the past, to locate piston rings in two-cycle engines by the use of dowel pins running through the ring and into the bottom of the ring grooves. Such a practice cannot be tolerated in high pressure engines, however, for the reason that the hole in the ring required for the location of the dowel pin so weakens the piston ring that fracture of the ring frequently occurs at its weakened point.

The primary object of the present invention is to provide a means of locating a piston ring in a high pressure internal combustion engine in such a manner as to improve the performance of the engine and its life by reason of improving the life of the piston rings.

Another object of the invention is to provide a means for locating the piston ring in a high pressure internal combustion engine which does not weaken the piston ring, which means is in effect, covered by the ends of the properly located ring and which is so constructed that it cannot work loose with changes in temperature and pressure.

It has also been found that piston rings in high pressure internal combustion engines are frequently subject to breakage by reason of the fact that the rings are supposed to operate with the same pressure behind them, in the ring groove space, as occurs in front of them, at the cylinder area. If the piston ring fits with an axial clearance of less than ten thousandths of an inch in its groove, then it becomes difficult for the pressure to build up behind the ring with sufficient rapidity and failure of the rings occur by reason of the fact that a much higher pressure occurs on the front face than exists on the rear face at the bottom of the ring groove. This causes the ring to be distorted inwardly in its groove and to move away from the cylinder surface, resulting in blow-by of the gas and also resulting in severe stress on the piston rings. It has been found that this difficulty can be avoided, not by the usual expedient of opening up the space into the bottom of the ring groove, but by making this space much smaller than has been thought possible in the past. I have found that, in practice, the space behind the piston ring should not exceed 22 percent of the total volume of the ring groove. If this limitation is followed, then even with a tightly fitting ring the gases from the cylinder will build up the pressure behind the piston ring sufficiently rapidly that no deterioration of the ring will occur, and the ring will continue to function as a sealing element with respect to the gases in the engine cylinder.

It is therefore another object of the invention to provide a shallower ring groove in which the volume behind the piston ring does not exceed 22 percent of the volume of the entire ring groove.

Other objects and advantages of the invention will become apparent from the following detailed description of a prefered form thereof, reference being had to the accompanying drawings, in which:

Fig. 2 is a section on line 2—2 of Fig. 1, somewhat enlarged;

Fig. 3 is a fragmentary section on line 3—3 of Fig. 2; and

Fig. 4 is a fragmentary vertical sectional view, somewhat enlarged, through a piston at the point of fixture of the piston ring ends.

Figure 1:
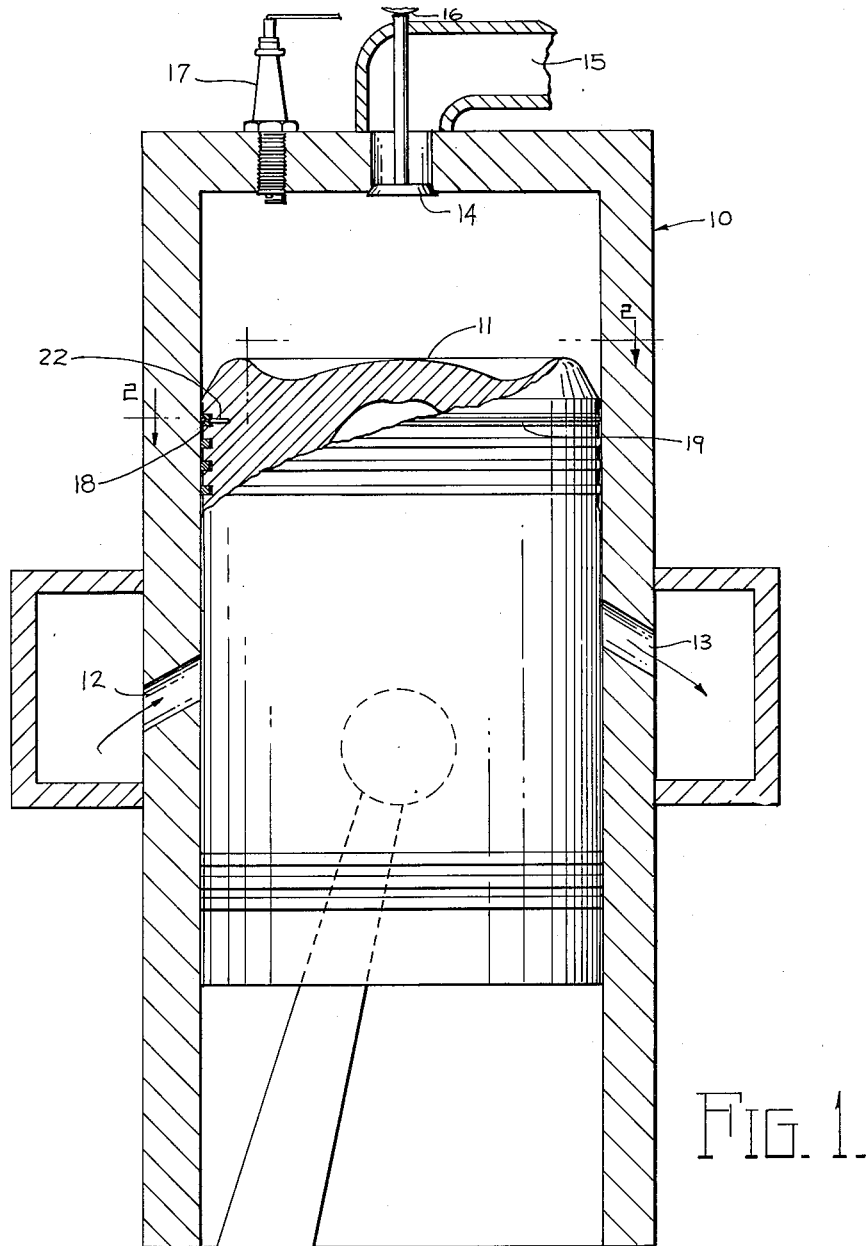
Fig. 1 is a diagrammatic vertical sectional view, with parts broken away, of a gas fueled engine embodying the present invention.

Referring to the drawings, and particularly to Fig. 1, the present invention is shown as being incorporated in a two-cycle internal combustion engine fueled primarily by a gaseous fuel that is introduced separately from the intake air. The engine comprises a cylinder 10 in which a piston 11 operates, the piston controlling intake ports 12 and exhaust ports 13 at the lower end of the cylinder as is common in two-cycle engine practice. Permanent gas fuel is introduced through a separate valve 14 at the top of the cylinder from a separate gas manifold 15, the gas inlet valve being operated by any suitable means, such as a cam 16 (shown only fragmentarily). The gaseous mixture between the air entering through the intake ports 12 and the gas introduced through the valve 14 is fired by any suitable ignition device such as a spark plug 17 or by the injection of a small quantity of "pilot oil" in a manner well known in the art.

As two-cycle gas engines of the type described have been caused to operate with higher and higher pressures to produce higher and higher specific outputs, piston ring failure has become a very serious problem.

The present invention is shown primarily in conjunction with the top piston ring of the series which are disposed around the piston 11, and the ring construction is best shown in Figures 2, 3 and 4. While the invention is applicable to any number of rings in the series, it is usually necessary only to protect the top ring.

The piston ring with which the invention is primarily concerned may consist of a ring of homogeneous metal or it may includes a ring having a harder insert in its wall, the insert being designated 19, and the piston ring body itself being designated 18 in the accompanying drawings.

As shown in Fig. 2 the two ends of the piston ring body 18 are recessed or cut away on the rear wall to form facing notches 20. The notches 20 surround, but do not touch, a locating means comprising a pin 22 received in a drilled hole 23 in the body of the piston 11. The pin 22 preferably comprises a strip of spring metal rolled upon itself for at least two turns so that the spring expands fully against the walls of the recess 23 and will not work loose. The clearance between the walls of the notches 20 and the pin 22 allows ample room for expansion of the ring body 18 as the engine becomes heated druing running.

The hole 23 and the pin 22 are located, as indicated in the drawings, in the area of the piston that passes always over the air intake side of the engine cylinder. Preferably, the ends of the piston ring between the notches 20 are so located that the ends of the ring reciprocate over a land or solid area between adjacent ones of the inlet passages 12, as shown in Fig. 2. Thus the wear on the ends of the ring is minimized since the ends of the ring are not called upon to pass over an intake port. Further, it will be seen that the ends of the ring are constantly being cooled by air entering the engine cylinder through the inlet ports 12. It has been found, particularly in high output two-cycle gas engines that if the ends of the piston ring reciprocate over or near the exhaust ports 13 the piston ring will be damaged and frequently broken, resulting in destruction of the piston and the surface of the cylinder. The damage probably occurs because the ends of the piston ring run at such a high temperature that the lubricating oil adjacent the ring ends is burned away.

It has been found that the piston ring groove, designated generally 21 in Figs. 2 and 4 should be so dimensioned that the maximum cross-sectional area of the clearance space behind the ring 18, when the ring is fully expanded against the walls of the cylinder 10, does not exceed 22 percent of the total area of the ring groove. In practice, the ring is inserted in the groove 21 with a clearance of approximately .010 inch, and this dimension is closed somewhat as the parts expand. If the volume of the groove behind the piston ring is made large, there will be a drop in pressure across the piston ring at each stroke of the engine sufficient, in some cases, to distort the ring and ultimately to break it. By making the volume of the space in the ring groove behind the piston ring small with relation to the total volume of the ring groove, it has been found that sufficient gas can pass into the bottom of the ring groove across the top of the ring to prevent a serious pressure drop and to minmize the in and out motion of the piston ring in its groove. It has been found that the cross-sectional area of this volume should not exceed 22 percent of the total cross-sectional area of the groove in which the piston ring is seated, so that the piston ring occupies at least 78 percent of the ring groove. It has also been found that this area may be restricted to 15 percent or less (85 percent of the groove being occupied by the ring) and the benefits of the invention will be obtained to an equal extent.

In operation, the piston ring 18 is assembled in the groove 21 after the spring pin 22 has been seated in its receiving hole 23. The hole 23, as above noted, is drilled in that portion of the piston which will be on the side adjacent or overlying the inlet ports 12, and preferably so located that the line of reciprocation of the pin 22 would be over a land 12a (Fig. 2) between adjacent ones of the inlet ports 12.

What I claim is:

1. In a two-cycle internal combustion engine having a piston which controls inlet and exhaust ports, said piston having a plurality of axially spaced piston rings carried thereby, the improvement comprising an upper piston ring having its end surfaces recessed at the inner side of the ring to form a groove, and a locating means fixed with relation to the adjacent body of the piston and having a projecting end received in said ring groove to prevent any rotational movement of said piston ring about the axis of said piston, said locating means being disposed on the side of said piston which overruns said inlet ports during engine operation.

2. The improvement defined in claim 1, in which the projecting end of said locating means is substantially covered by the outer surface of said piston ring.

3. The improvement defined in claim 1, in which said locating means comprises a strip of spring metal wound upon itself in a plurality of turns prior to being placed in said piston body.

References Cited in the file of this patent

UNITED STATES PATENTS

| | | |
|---|---|---|
| 1,035,488 | Stewart | Aug. 13, 1912 |
| 1,094,398 | Anderson | Apr. 21, 1914 |
| 1,456,708 | Osborn | May 29, 1923 |
| 1,757,877 | Roberts | May 6, 1930 |
| 1,777,501 | Niethamer | Oct. 7, 1930 |
| 2,192,926 | Meyer | Mar. 12, 1940 |